(12) United States Patent
Chen

(10) Patent No.: US 7,848,086 B1
(45) Date of Patent: Dec. 7, 2010

(54) POWER SUPPLY FIXING DEVICE

(75) Inventor: Deng-Hsi Chen, Keelung (TW)

(73) Assignee: Lian-Li Industrial Co., Ltd., Keelung (TW)

( * ) Notice: Subject to any disclaimer, the term of this patent is extended or adjusted under 35 U.S.C. 154(b) by 11 days.

(21) Appl. No.: 12/471,827

(22) Filed: May 26, 2009

(51) Int. Cl.
H05K 5/00 (2006.01)
(52) U.S. Cl. ............................... 361/679.01; 312/223.1
(58) Field of Classification Search ............ 361/679.01; 403/330
See application file for complete search history.

(56) References Cited

U.S. PATENT DOCUMENTS

| 5,745,342 | A * | 4/1998 | Jeffries et al. ............. 361/679.6 |
| 5,777,848 | A * | 7/1998 | McAnally et al. ........... 361/725 |
| 5,790,372 | A * | 8/1998 | Dewey et al. .......... 361/679.58 |
| 5,791,753 | A * | 8/1998 | Paquin ..................... 312/332.1 |
| 6,288,332 | B1 * | 9/2001 | Liu et al. .................... 174/542 |
| 6,530,628 | B1 * | 3/2003 | Huang et al. ............. 312/223.2 |
| 6,751,100 | B2 * | 6/2004 | Chen .......................... 361/725 |
| 7,057,898 | B2 * | 6/2006 | Chen et al. .................. 361/725 |
| 7,088,587 | B2 * | 8/2006 | Chen et al. .................. 361/724 |
| 7,123,469 | B2 * | 10/2006 | Chen et al. .................. 361/601 |
| 7,206,197 | B2 * | 4/2007 | Chen et al. ............. 361/679.02 |
| 7,218,508 | B2 * | 5/2007 | Chen et al. ............. 361/679.57 |
| 7,254,011 | B2 * | 8/2007 | Chen et al. ............. 361/679.01 |
| 2005/0018387 | A1 * | 1/2005 | Chou ......................... 361/679 |
| 2005/0117290 | A1 * | 6/2005 | Chen et al. .................. 361/686 |
| 2009/0310299 | A1 * | 12/2009 | Liu ....................... 361/679.58 |

* cited by examiner

*Primary Examiner*—Lisa Lea-Edmonds
(74) *Attorney, Agent, or Firm*—Muncy, Geissler, Olds & Lowe, PLLC

(57) ABSTRACT

A power supply fixing device can effectively fix a power supply inside a computer case. One end of the power supply fixing device is movably assembled at a plate in the computer case, and a suppress surface is used to suppress the power supply. In addition, by hooking at the other end, which is formed at the fixing device, to the other plane of the computer case, and by moving an operating member of the fixing device to a packing position, the entire power supply can be fixed. The entire operation process is performed without an aid of a hand tool, and there is no need to use screws or screw holes, such that the power supply can be dismantled and assembled more conveniently.

8 Claims, 8 Drawing Sheets

POWER SUPPLY FIXING DEVICE

BACKGROUND OF THE INVENTION a) Field of the Invention

The present invention relates to a power supply fixing device, and more particularly to a power supply fixing device which can accomplish assembling and dismantling a power supply without using a hand tool.

b) Description of the Prior Art

As continuous advancement of technologies, a computer is more and more popular and has become a necessity in a daily life or of work for an ordinary person. An interior of an ordinary computer host is assembled with a mother board which is connected to a hard disk drive, a CD-ROM (Compact Disk-Read Only Memory) drive and a display card. The computer host is also provided with the power supply to supply required electricity.

Referring to FIG. 1, it shows a three-dimensional view of a conventional computer case. As shown in the drawing, a power supply 101 is assembled at the rear planar position of a computer case 10 which provides electricity for the electronic devices inside the computer case 10. When assembling the power supply 101 inside of the conventional computer case 10, first, abutting the power supply 101 on the rear planar inside of the computer case 10, and then using a hand tool to lock the power supply 101 on the back rear planar of the computer case 10 with an plural screws 11.

However, this conventional assembling method can only fix on one end of the power supply 101, which causing vibration and noise when the entire computer host is operating. In addition, when a user is assembling or dismantling the power supply 101, a hand tool must be used, which complicates the dismantling process. Furthermore, the screws 11 after dismantling are not easy to keep for collection, and can be lost easily.

SUMMARY OF THE INVENTION

Accordingly, the inventor of the present invention studies and analyzed the assembling and operations of the power supply, so as to find out a more suitable solution.

Therefore, the first object of the present invention is to provide a power supply fixing device which can be effectively fixed a power supply inside of a computer case without using any hand tools.

As above, to form a movable assembling of the power supply fixing device of the present invention, is by using a first hook portion which is formed at one end of the fixing device to hook at a first hook hole inside the computer case. And suppress the power supply by formed suppress portion, and then hook the second hook hole inside the computer case by using the second hook portion on the other end of the fixing device, and move the operating member of the fixing device to a packing position, which allowing the suppress portion to suppress the power supply so that the power supply can be fully positioned, so as to quickly accomplish entire assembling and to effectively fix the power supply. In addition, when the entire computer host is operating, the suppress portion can effectively suppress the power supply, and prevent vibration and reduce generation of noise as well.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
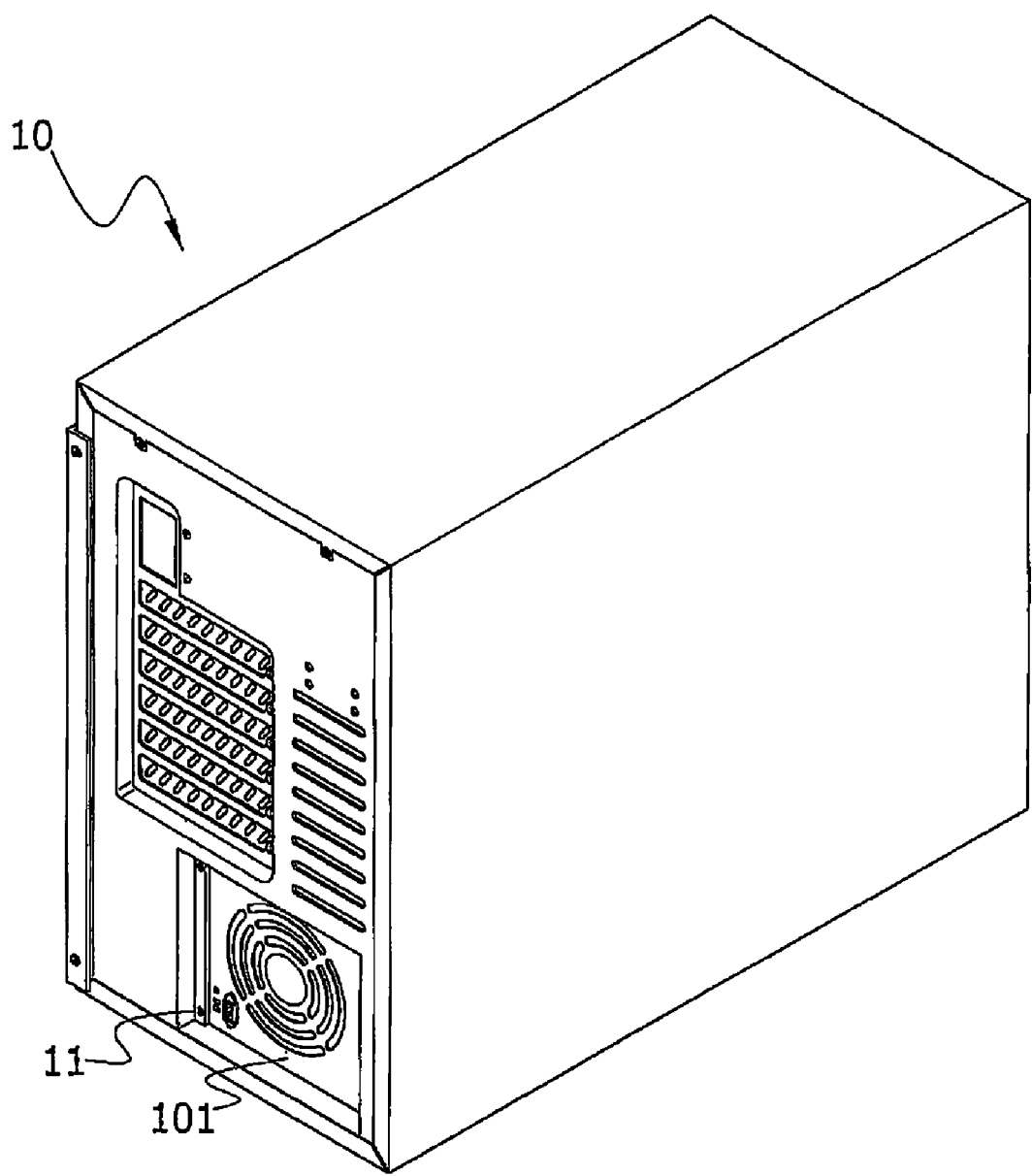
FIG. 1 shows a three-dimensional view of a conventional computer case.
Figure 2:
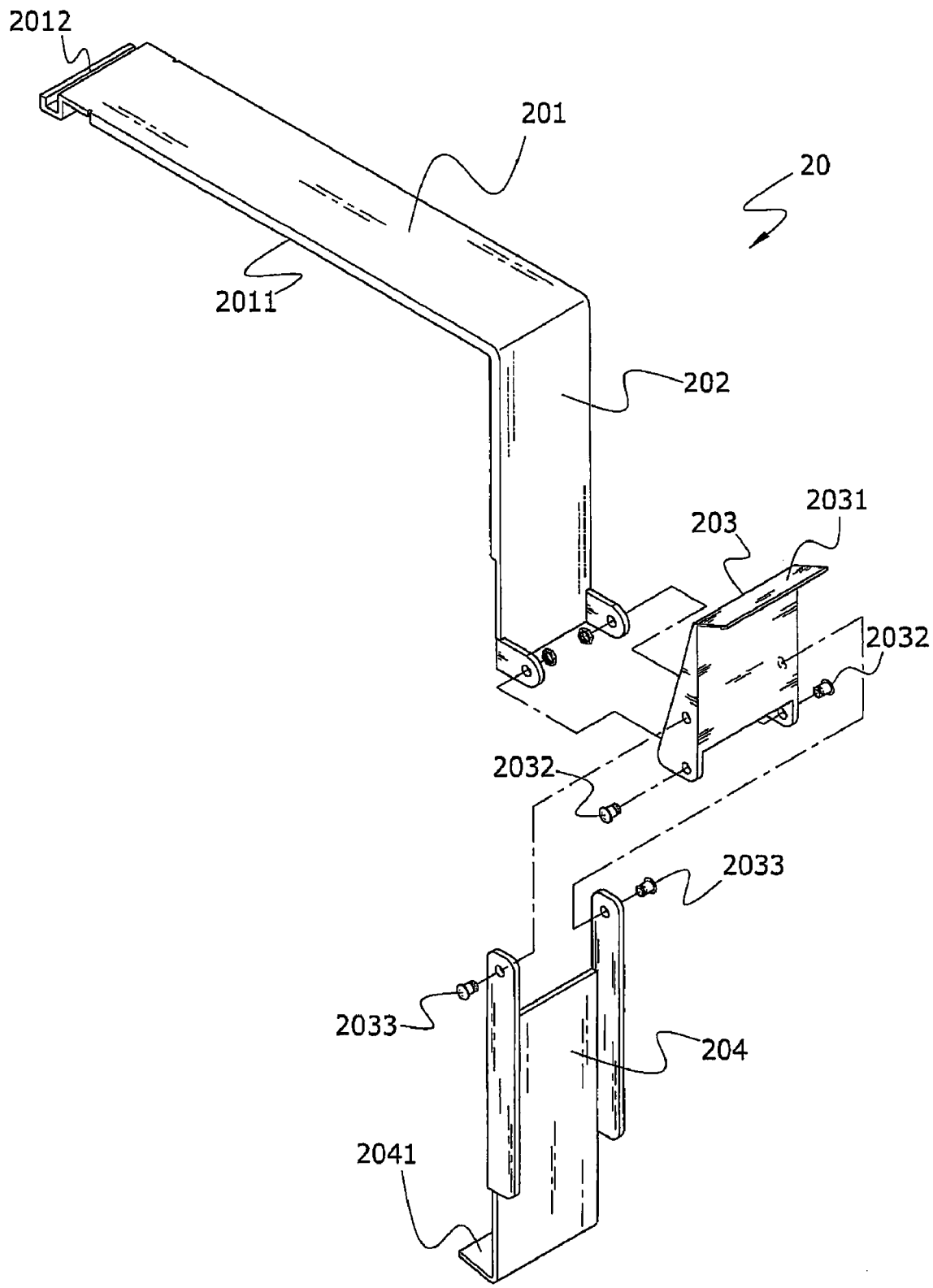
FIG. 2 shows a schematic view of structures of the present invention upon assembling.
Figure 3:
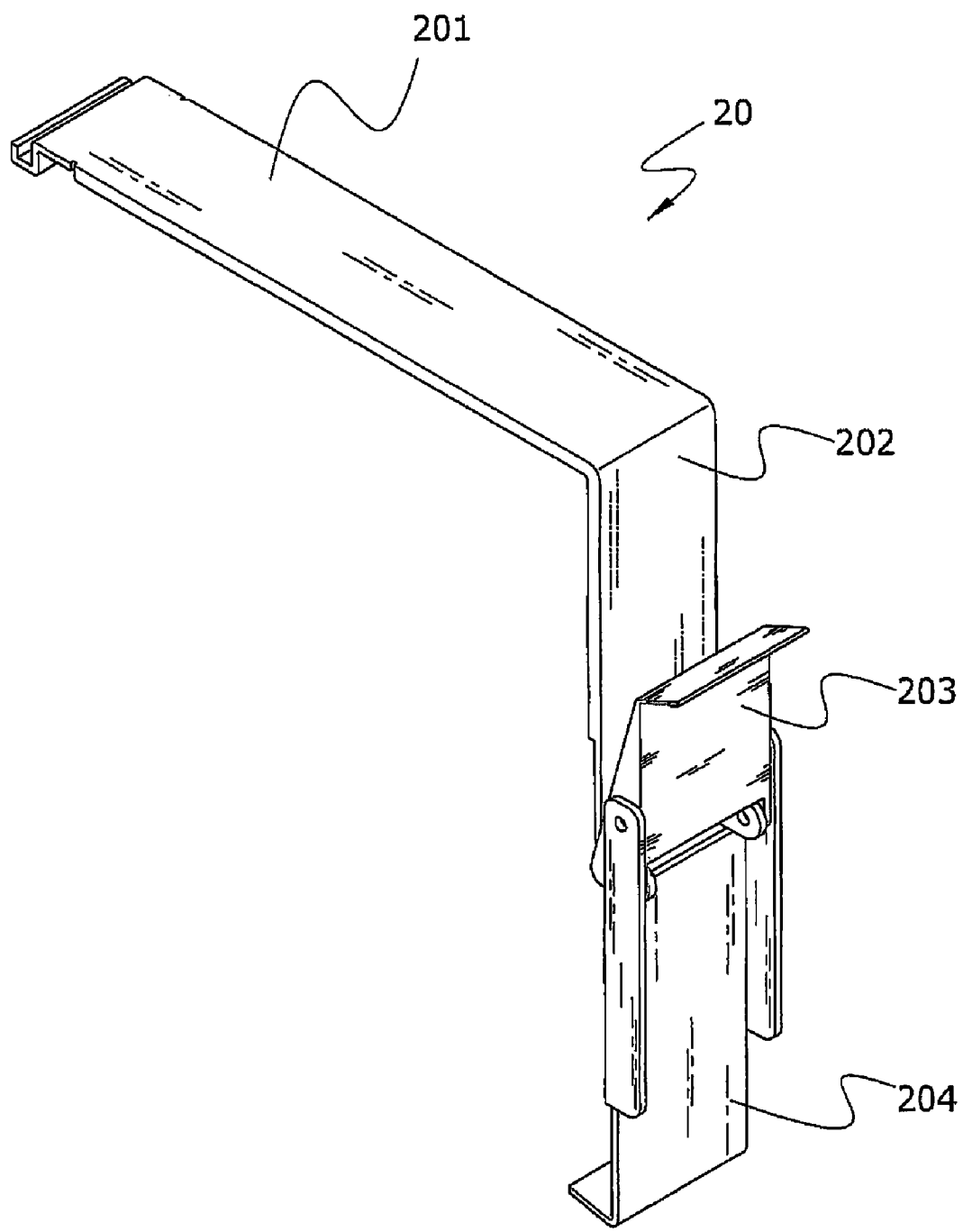
FIG. 3 shows a schematic view of the present invention after being assembled.

Referring to FIG. 2, it shows a schematic view of structures of the present invention upon assembling. As shown in the drawing, a power supply fixing device 20 comprises a suppress portion 201, a plane portion 202, an operating member 203 and a positioning portion 204, wherein the suppress portion 201 is in a plane-shape, and the suppress surface 2011 is formed at the lower plane of the suppress portion 201, a first hook portion 2012 is formed at one end of the suppress portion 201, first hook portion, and the other end of the suppress portion 201 is extended downward to formed the plane portion 202, and pivoted the first pivot piece 2032 with the operating member 203 (which is in triangular shape) on the plane portion 202. The operating member 203 provided a toggle portion 2031 allowing user to toggle with fingers. By toggling the toggle portion 2031, makes the operating member 203 rotate through the first pivot piece 2032. On the other hand, the positioning member 204 is pivoted with the second pivot piece 2033 on the operating member 203, and a second hook portion 2041 is formed at one end of the positioning member 204. As shown in the drawing again, the suppress portion 201 is connected with the plane portion 202, and the two members can be formed integrally. However, there is no limitation in the present invention, and it is also feasible that the two members are separable individual units which can be pivoted together. Furthermore, the suppress portion 201 is perpendicular to the plane portion 202 with each other, and the included angle can be a little bit larger or smaller than 90°, as in FIG. 3, which shows a schematic view of the present invention after being assembled.

Figure 4:
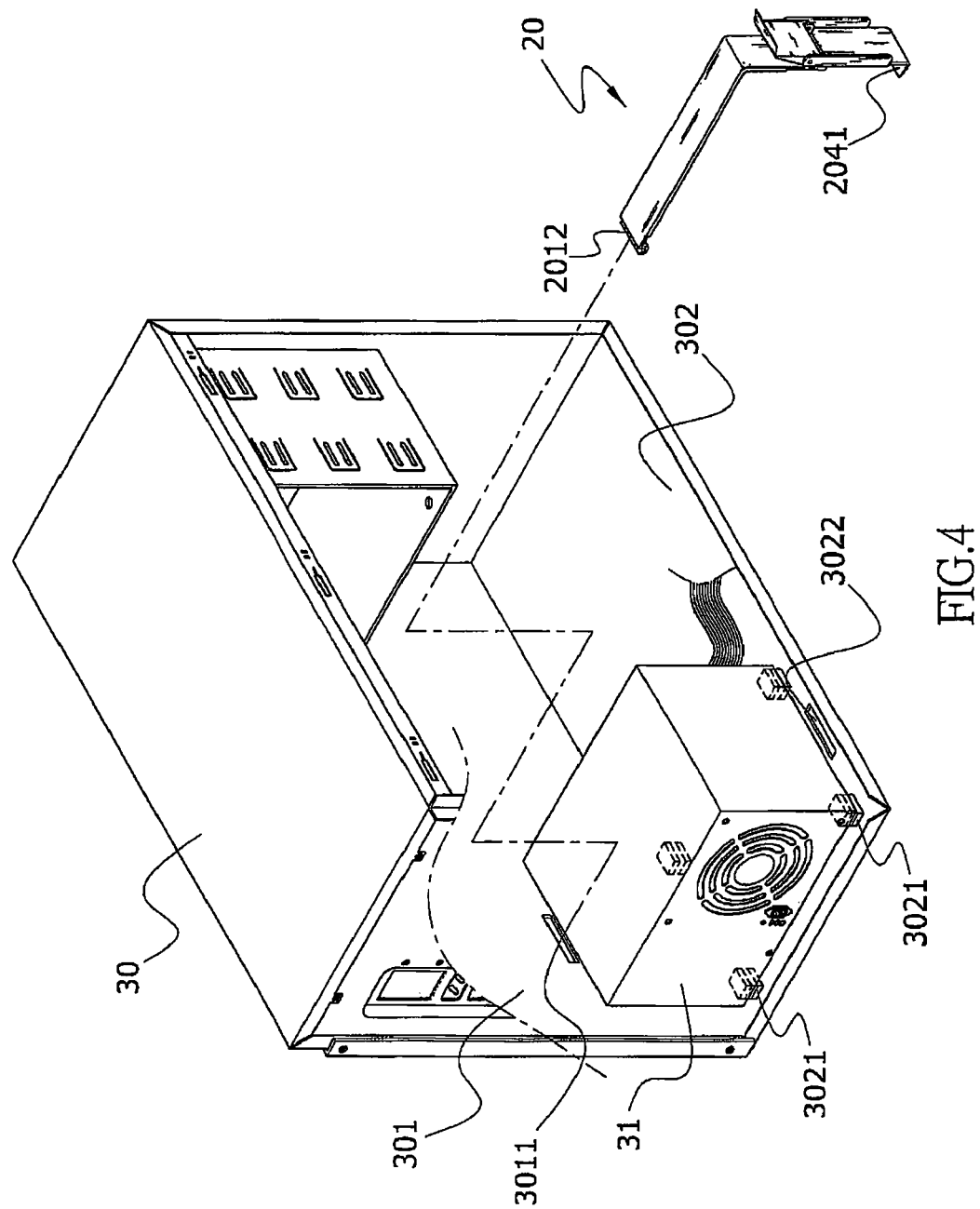
FIG. 4 shows a schematic view of an implementation of the present invention.

Referring to FIG. 4, it shows a schematic view of an implementation of the present invention. As shown in the drawing, a computer case 30 which has a side plate 301 and a bottom plate 302 which are perpendicular to each other, wherein, the first hook hole 3011 is formed on the side plate 301, and the plural elastic pads 3021 is attached on the bottom plate 302 of the computer case 30, which the power supply 31 can be emplaced on. And the second hook hole 3022 is formed on the bottom plate 302. The power supply fixing device 20 disclosed by the present invention. The first hook portion 2012 on the one end of the fixing device 20 is able to locked the first hook hole 3011, and the second hook portion 2041 is able to locked the second hook hole 3022.

Figure 5:
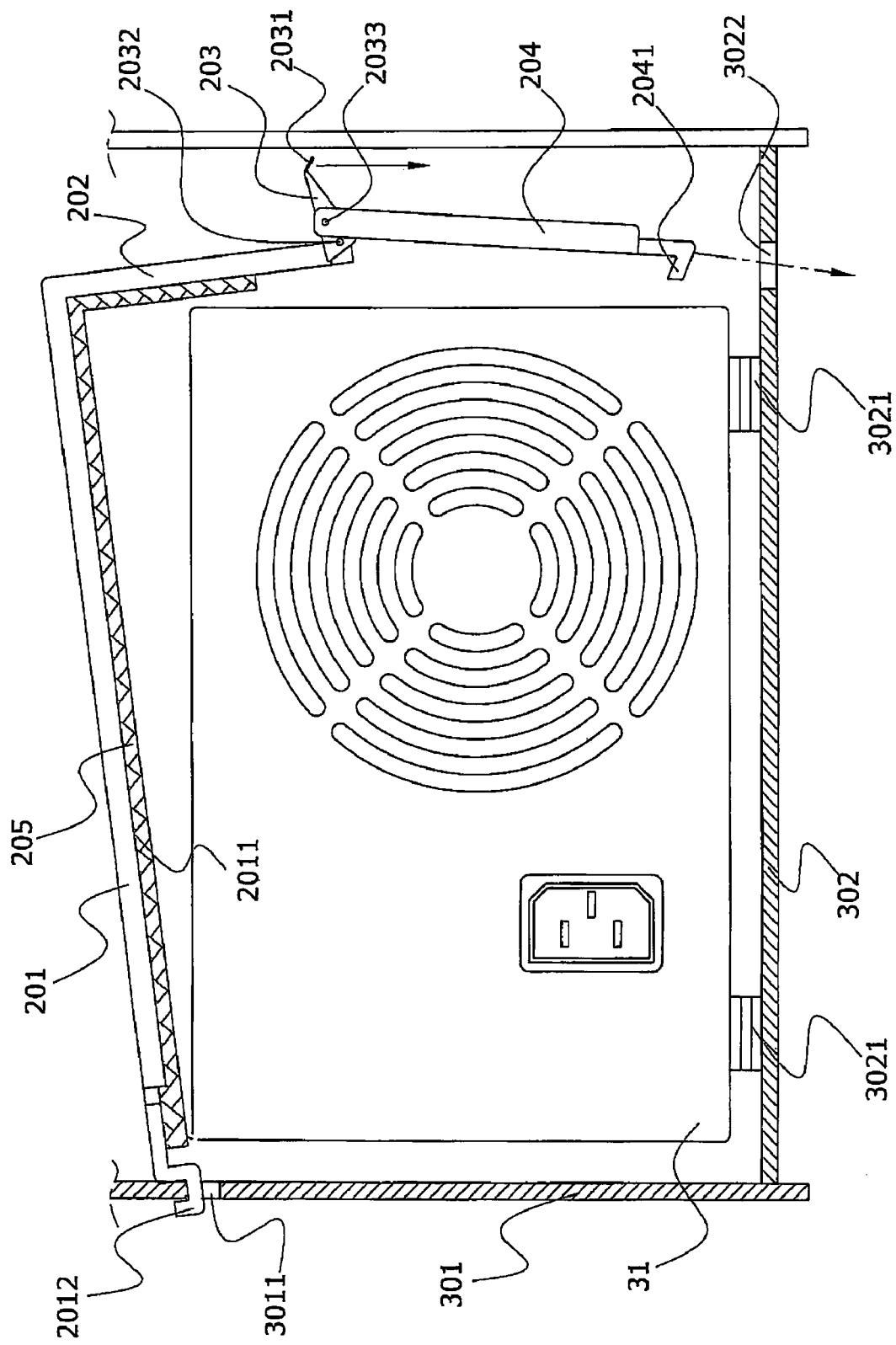
FIG. 5 shows a first schematic view of operations of the present invention.
Figure 6:
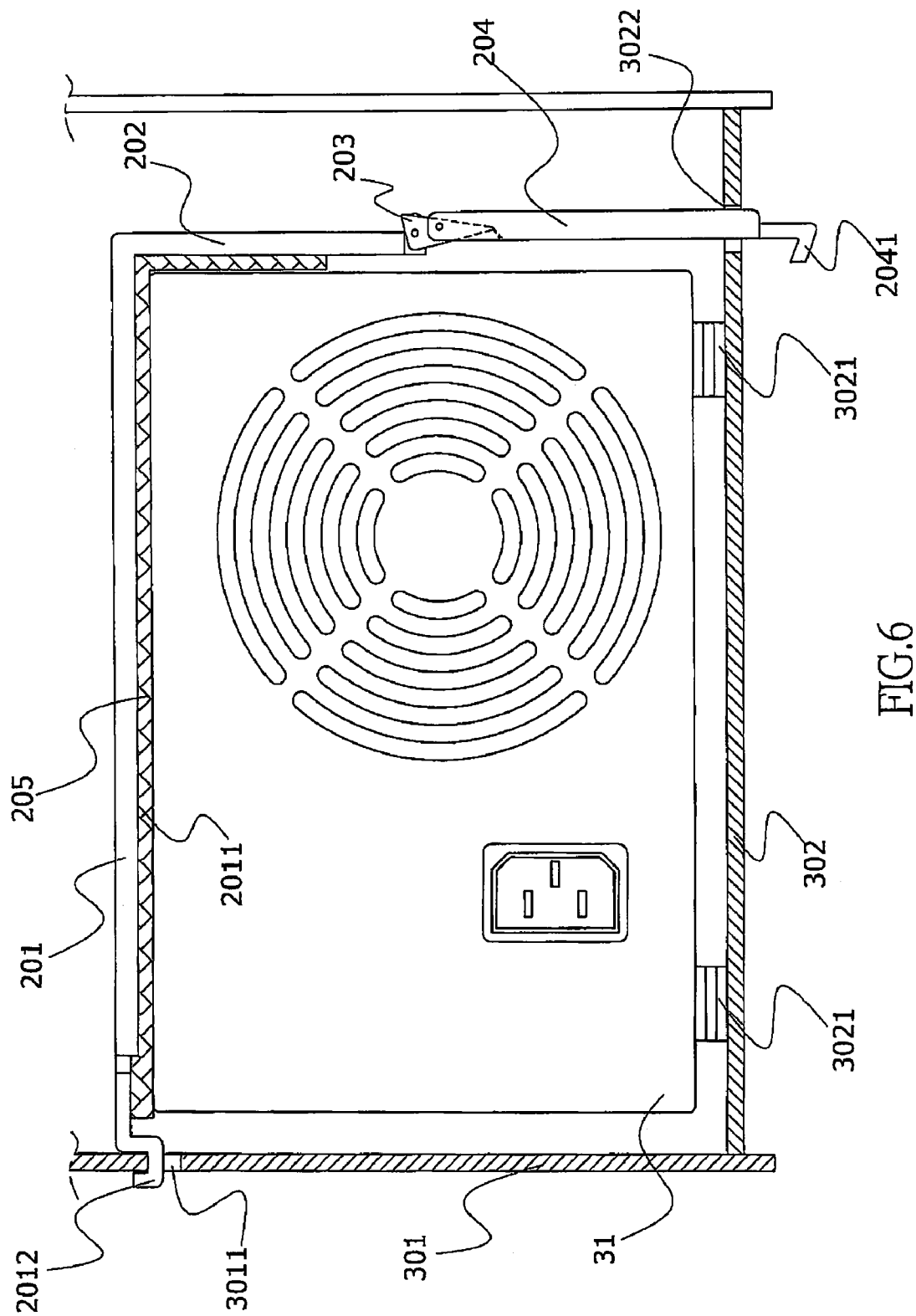
FIG. 6 shows a second schematic view of operations of the present invention.

Referring to FIG. 5, it shows a first schematic view of operations of the present invention. As shown in the drawing, when implementing the present invention, first, emplaced the power supply 31 on the plural elastic pads 3021 inside the computer case 30, and then locked the first hook portion 2012 of the power supply fixing device 20 with the first hook hole 3011 of the computer case 30, allowing one end of the power supply fixing device 20 to be movably assembled on the computer case 30. After one end of the power supply fixing device 20 has been assembled, as shown in the drawing, and then depressing the plane portion 202, the operating member 203, and the positioning member 204 downward (as shown by the arrow in the drawing), and user can linking-up the second hook portion 2041 into the second hook hole 3022 by pressing the toggle portion 2031. Referring to FIG. 6, it shows a second schematic view of operations of the present invention. When the first hook portion 2012 is locked with the first hook hole 3011, move down the plane portion 202, the operating member 203 and the positioning member 204, which allowed the suppress surface 2011 of the suppress portion 201 gradually abut to the upper surface of the power supply 31, and when the suppress surface 2011 is close abut to the power supply 31, the power supply 31 is effectively fixed under the action force of the suppress surface 2011 by continuously pressing down the plane portion 202, the second hook portion 2041 will moving downward through the second hook hole 3022.

Figure 7:
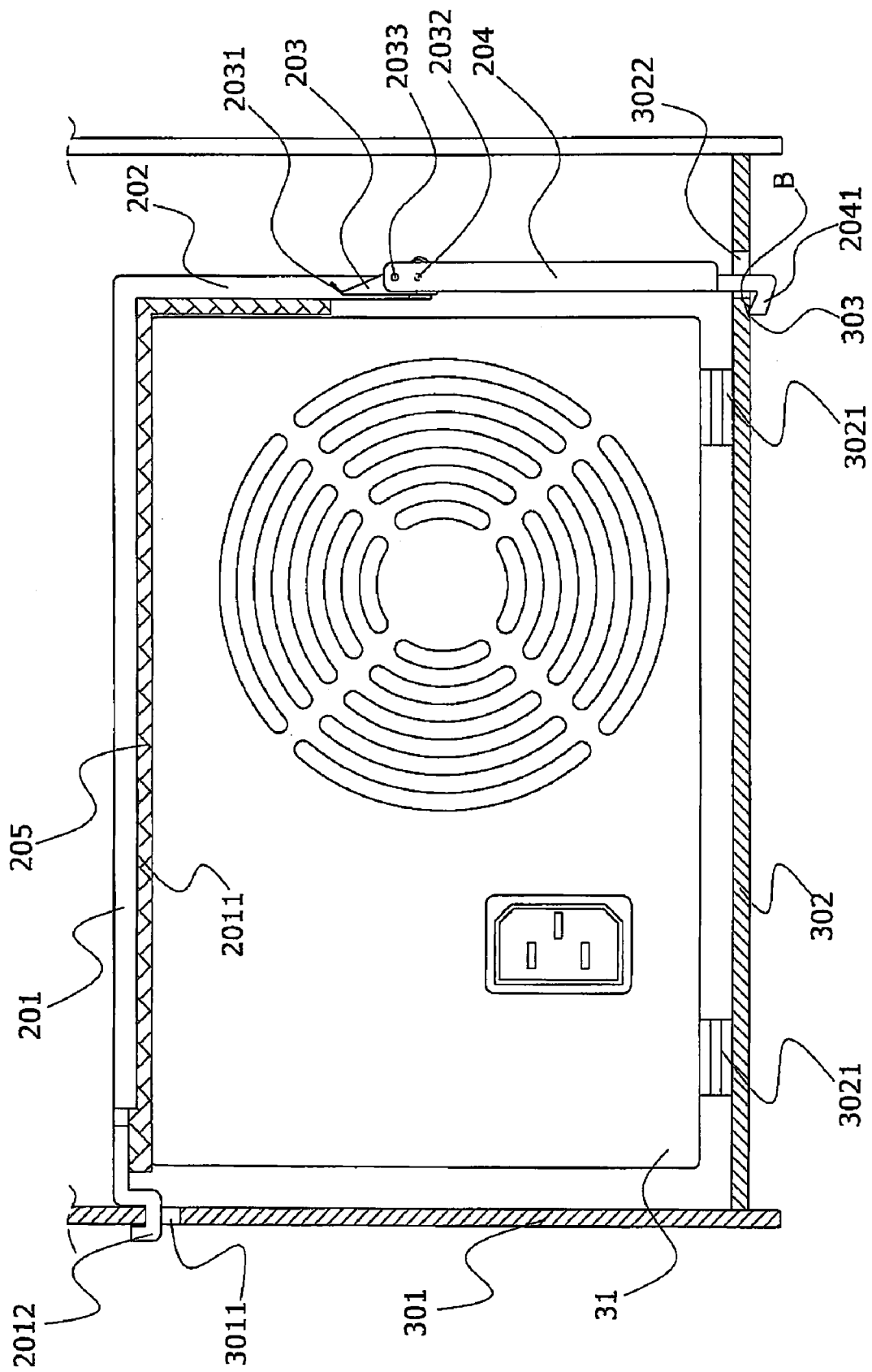
FIG. 7 shows a third schematic view of operations of the present invention.

Referring to FIG. 7, it shows a third schematic view of operations of the present invention. Press the toggle portion 2031 upward after the second hook portion 2041 passed through the second hook hole 3022, enabling the operating member 203 to rotate upward through the first pivot piece 2032 to a packing position. Which linking-up the positioning member 204 rotate upward through the second pivot piece 2033, as the second hook portion 2041 move upward to locked with the second hook portion 2041, thereby, effectively fixed the power supply 31 by the power supply fixing device 20. By that the first hook portion 2012 and the second hook portion 2041 on the two side of the power supply fixing device 20 are respectively locked with first hook hole 3011 and the second hook hole 3022 inside the computer case 30, so the power supply 31 can be fixed inside the computer case 30 by the power supply fixing device 20. And during assembling, the power supply 31 can be fixed without using screws or other hand tool, thereby allowing the user to assemble or dismantle the power supply 31 more quickly.

When the user is intend to dismantle the power supply 31, press the toggle portion 2031 downward, as the operating member 203 rotating downward through the first pivot piece 2032 to release the packing position. And linking-up the positioning member 204 to rotate downward through the second pivot piece 2033, which allows the second hook portion 2041 to release from a contact point B, such that the entire power supply fixing device 20 can be in a loosened state that the dismantling can be accomplished.

Referring to FIGS. 5 to 7, the elastic pad 205 can be glued on the rear surfaces of the suppress surface 2011 and plane portion 202, to abut to the rear side of the suppress surface 2011 of the power supply 31 and the plane portion 202, to tighten two corresponding sides of the power supply 31, thereby achieving a better fixing effect.

Referring to FIG. 7 again, when a computer host is operating, relative vibration will be resulted. In order to assure that a locking effect of the second hook portion 2041 will not be affected by the vibration, a further locking slot 303 can be formed at the hook portion of the second hook portion 2041, such that when the second hook portion 2041 is locked with the second hook hole 3022, the tail end of the second hook portion 2041 can hook at the locking slot 303 to increase stability after hooking, thereby assuring that the power supply fixing device 20 will not be loosened by the vibration.

Figure 8:
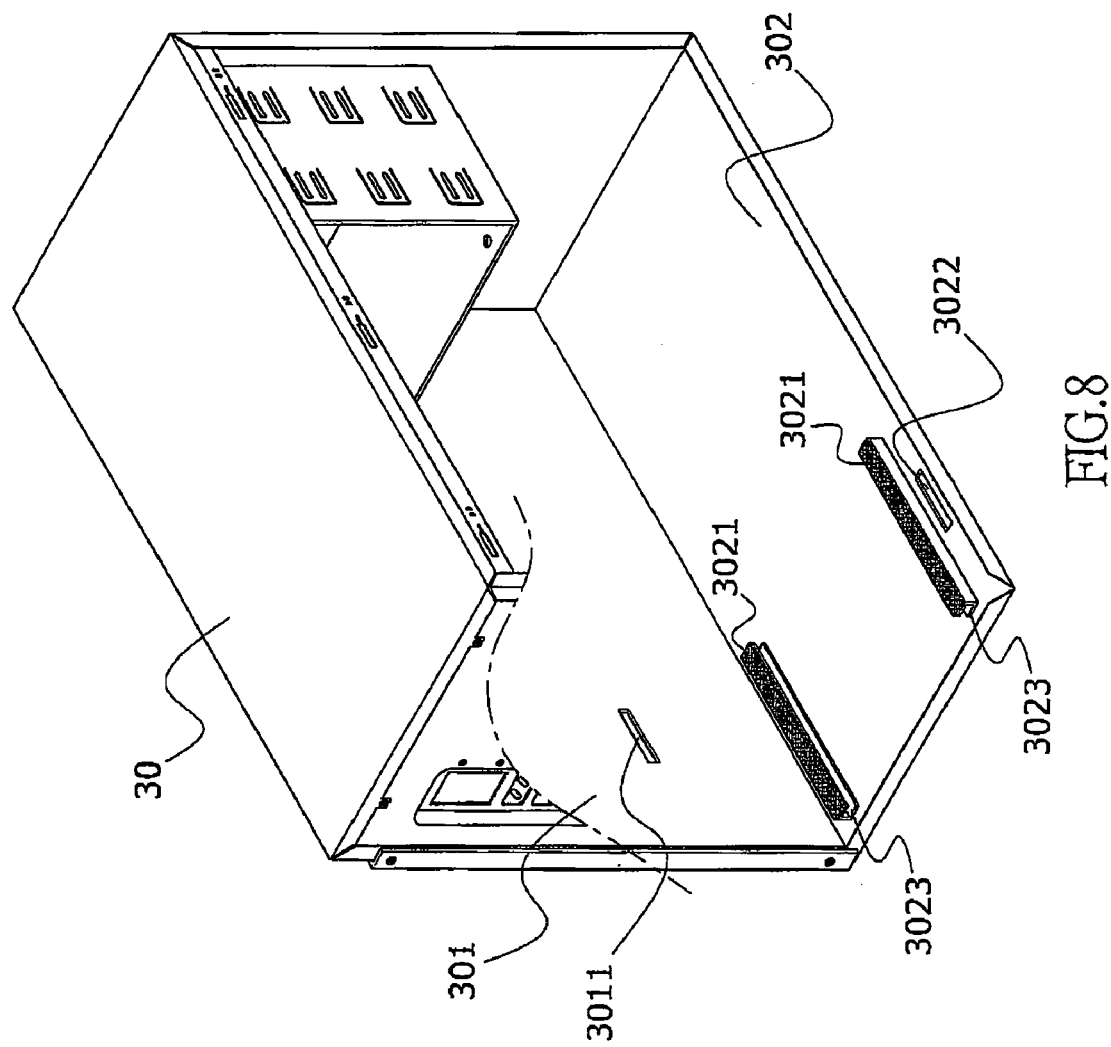
FIG. 8 shows a schematic view of another preferred embodiment of the present invention.

Referring to FIG. 8, it shows a schematic view of another preferred embodiment of the present invention. As shown in the drawing, the elastic pads 3021 disclosed in the present embodiment are only used as an example that a quantity of the elastic pads of the present invention is not limited, with the quantity being changeable according to realistic structures. Moreover, the elastic pads 3021 can be made into long strips, fitted with long pad seats 3023, such that when assembling the power supply, the force on the bottom can be distributed more uniformly, thereby increasing entire stability in use.

Accordingly, in the present invention, is to formed a first hook hole and a second hook hole inside of the computer case, and locked the first hook hole with the first hook portion of the fixing device, move the operating member of the fixing device to a packing position, as the second hook portion is able to locked with the second hook hole, such that when the power supply is assembled with the computer case, the power supply can be quickly assembled or dismantled by locking the fixing device with the computer case, without using additional assembly parts such as the screws or screw holes, and the hand tools. Therefore, the user can more easily and conveniently accomplish the assembling operation, and any part can be prevented from losing that the power supply cannot be assembled in a later time. In addition, the present invention uses the suppress portion to suppress the power supply; hence, when the entire computer host is operating, the vibration will not be resulted easily and the noise can be reduced, too.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A power supply fixing device which is assembled inside a computer case to fix a power supply inside the computer case, a first hook hole is formed on the side plate of the computer case, and a second hook hole is formed on the bottom plate of the computer case, the power supply fixing device comprising a suppress portion, which formed a first hook portion at one end, to locked with the first hook hole of the computer case, and the other end extended to formed a plane portion; an operating member, which is pivoted with the plane portion through the first pivot piece; and a positioning member, which one end is pivoted with the plane portion through the second pivot piece, and the second hook portion is formed at the other end, to locked the second hook hole of the computer case when the operating member moves to a packing position.

2. The power supply fixing device according to claim 1, wherein the suppress portion is integrally formed with the plane portion.

3. The power supply fixing device according to claim 1, wherein the suppress portion is perpendicular to the plane portion.

4. The power supply fixing device according to claim 1, wherein the suppress portion is pivoted with the plane portion.

5. The power supply fixing device according to claim 1, wherein a bottom plane of the suppress portion is formed with a suppress surface.

6. The power supply fixing device according to claim 5, wherein the suppress surface is glued with at least one elastic pad.

7. The power supply fixing device according to claim 1, wherein when a second hook portion locked with the second hook hole, a contact point is formed at the bottom plate.

8. The power supply fixing device according to claim 7, wherein a locking slot is formed correspondence at the contact point on the bottom plate.

* * * * *